United States Patent

Morii et al.

Patent Number: 5,505,919
Date of Patent: Apr. 9, 1996

[54] METHOD FOR THE DENITRATION OF EXHAUST GAS

[75] Inventors: Atsushi Morii; Satoru Serizawa; Osamu Naito; Masanori Demoto; Toshiyuki Onishi, Nagasaki; Norihisa Kobayashi, Tokyo; Kouzo Iida, Hiroshima, all of Japan

[73] Assignee: Mitsubishi Jukogyo Kabushiki Kaisha, Tokyo, Japan

[21] Appl. No.: 282,962

[22] Filed: Jul. 29, 1994

[30] Foreign Application Priority Data

Aug. 3, 1993 [JP] Japan ................... 5-192127

[51] Int. Cl.⁶ .................................... B01J 8/02
[52] U.S. Cl. ..................... 423/213.5; 423/213.7; 423/239.1; 423/405
[58] Field of Search ............... 423/235, 239.1, 423/213.5, 213.7, 405

[56] References Cited

U.S. PATENT DOCUMENTS 3,919,397  11/1975  Gould ..................... 423/405

FOREIGN PATENT DOCUMENTS 59-95922  6/1984  Japan.

OTHER PUBLICATIONS

*Unit Processes and Principles of Chemical Engineering*, Olsen, Jul. 5, 1932 pp. 1–3.

Primary Examiner—Michael Lewis
Assistant Examiner—Thomas G. Dunn, Jr.
Attorney, Agent, or Firm—Arnold, White & Durkee

[57] ABSTRACT

A method for the denitration of exhaust gas from a gas turbine or an internal combustion engine which comprises (a) reducing a part of the $NO_2$ constituting $NO_x$ contained in the exhaust gas to NO by means of a reduction catalyst bed for reducing $NO_2$ to NO, the reduction catalyst bed being installed in flow communication with the exhaust gas outlet of the gas turbine or internal combustion engine, and (b) injecting $NH_3$ into the exhaust gas within an exhaust heat recovery unit and then decomposing and removing $NO_x$ contained in the exhaust gas and now composed chiefly of NO, by means a denitration catalyst bed installed within the exhaust heat recovery unit to effect the catalytic reduction of $NO_x$ with $NH_3$.

6 Claims, 2 Drawing Sheets

METHOD FOR THE DENITRATION OF EXHAUST GAS

FIELD OF THE INVENTION AND RELATED ART STATEMENT

This invention relates to a method for the denitration of exhaust gas from a gas turbine or an internal combustion engine.

Conventionally, $NO_x$ (a general term for nitrogen oxides) has been removed solely by means of a dry denitrator using $NH_3$ as a reducing agent, without providing any $NO_x$ reducing means at the outlet of a gas turbine or internal combustion engine. A denitration system installed in a conventional combined plant is explained below with reference to FIG. 4. An exhaust gas duct 2 from a gas turbine or internal combustion engine 1 is connected with an exhaust gas boiler 3 which is followed by an exhaust gas duct 4 and a smokestack 5.

In the conventional denitration system, a plurality of heat exchangers 8, 9 and 10 are disposed within the exhaust gas boiler 3, and a denitrator 7 packed with a $NO_x$ reduction catalyst is installed between heat exchangers 9 and 10. Moreover, an $NH_3$ injection nozzle 6 for injecting a $NO_x$ reducing agent such as $NH_3$ is disposed upstream of the denitrator 7 in the exhaust gas flow. $NO_x$ reacts with $NH_3$ under the action of the $NO_x$ reducing agent to decompose the $NO_x$ to $N_2$ and $H_2O$.

For gas turbines and internal combustion engines such as diesel engines, the proportion of $NO_2$ in $NO_x$ tends to be higher than that of NO because the $O_2$ concentration in exhaust gas is high as compared with that in boiler exhaust gas. It has been found that a dry denitrator using $NH_3$ as a reducing agent, which has conventionally been employed for the removal of $NO_x$, removes $NO_x$ according to the following equations (1), (2) and (3):

   (1)

   (2)

   (3)

While the reaction rates of equations (1) and (2) are almost equal, the reaction rate of equation (3) is much lower than those of equations (1) and (2). When the proportion of $NO_2$ in exhaust gas is high, NO and a part of the $NO_2$ are removed according to equation (2) and the residual $NO_2$ decomposes according to equation (3). However, the reaction of equation (3) is so slow that a part of the $NO_2$ will remain unreacted and flow downstream. Thus, while NO can be removed satisfactorily, $NO_2$ is difficult to remove. Consequently, the conventional denitration system has the disadvantage that its denitration performance is lowered as the proportion of $NO_2$ in $NO_x$ becomes higher.

OBJECT AND SUMMARY OF THE INVENTION

In view of the above-described existing state of the art, it is an object of the present invention to provide a method for removing $NO_x$ efficiently, even from exhaust gas containing a high proportion of $NO_2$.

According to the present invention, there is provided a method for the denitration of exhaust gas from a gas turbine or internal combustion engine which comprises (a) reducing a part of the $NO_2$ constituting $NO_x$ contained in the exhaust gas to NO by means of a reduction catalyst bed for reducing $NO_2$ to NO, the reduction catalyst bed being installed in flow communication with the exhaust gas outlet of the gas turbine or internal combustion engine, and (b) injecting $NH_3$ into the exhaust gas within an exhaust heat recovery unit and then decomposing and removing $NO_x$ contained in the exhaust gas and now composed chiefly of NO, by means a denitration catalyst bed installed within the exhaust heat recovery unit to effect the catalytic reduction of $NO_x$ with $NH_3$.

Specifically, in order to treat exhaust gas containing a high proportion of $NO_2$, a reduction catalyst bed for reducing $NO_2$ to NO is installed on the upstream side of a dry denitrator using $NH_3$ as a reducing agent so that the proportion of $NO_2$ in the whole $NO_x$ at the inlet of the dry denitrator may be lowered to facilitate the efficient removal of $NO_x$. The proportion of $NO_2$ in the whole $NO_x$ is preferably lowered to 70% or less and more preferably to 50% or less.

Since it has been found that the use of a reduction catalyst causes $NO_2$ present in exhaust gas to be partially reduced to NO, a reduction reaction represented by the following equation (4) can be effected by installing the above-described reduction catalyst bed on the upstream side of the dry denitrator in the flow of the exhaust gas.

   (4)

This lowers the proportion of $NO_2$ at the inlet of the dry denitrator. As a result, the reaction represented by the above equation (3) is suppressed to the fullest extent, making it possible to remove $NO_x$ efficiently.

DETAILED DESCRIPTION OF PREFERRED EMBODIMENTS

Figure 1:
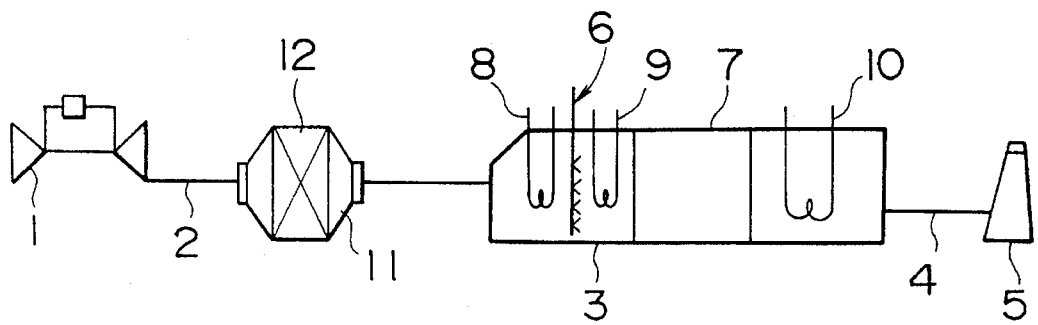
FIG. 1 is a schematic flow diagram illustrating one embodiment of the present invention.

In order to explain the effects of the present invention, the removal of $NO_x$ in a combined plant provided with a means for reducing $NO_2$ to NO in accordance with one embodiment of the present invention is discussed below with reference to FIG. 1. An $NO_2$ reduction unit 11 for reducing $NO_2$ to NO is installed in flow communication with an exhaust gas duct 2 from a gas turbine or internal combustion engine 1. Connected to the downstream side thereof is an exhaust gas boiler 3. This exhaust gas boiler 3 comprises a plurality of heat exchangers 8, 9 and 10, an $NH_3$ injection nozzle 6 disposed between heat exchangers 8 and 9, and a denitrator 7 disposed between heat exchangers 9 and 10 and packed with a $NO_x$ reduction catalyst. Furthermore, an exhaust gas duct 4 and a smokestack 5 are installed on the downstream side of the exhaust gas boiler 3.

Exhaust gas produced in the gas turbine 1, which contains large quantities of NO and $NO_2$, is introduced through the exhaust gas duct 2 into the $NO_2$ reduction unit 11 packed with an $NO_2$ reduction catalyst 12 for reducing $NO_2$ to NO, where most of the $NO_2$ present in the exhaust gas is reduced to NO. Thereafter, the exhaust gas is introduced into the exhaust gas boiler 3 disposed downstream, where it is cooled by the heat exchanger 8 and 9 to a low temperature suitable for denitration reactions. At the same time, $NH_3$ is injected from the $NH_3$ injection nozzle 6 into the exhaust gas and mixed therewith. Then, $NO_x$ (i.e., NO and $NO_2$) is removed by the denitrator 7 packed with a denitration catalyst. Finally, the exhaust gas is conducted through the exhaust gas duct 4 and discharged through the smokestack into the air.

The temperature of exhaust gas produced in the gas turbine 1 is in the range of 500° to 600° C. and remains equally high in the $NO_2$ reduction unit 11. One example of the $NO_2$ reduction catalyst 12 for reducing $NO_2$ to NO, which is packed in the $NO_2$ reduction unit 11, is a catalyst prepared by wash-coating an inorganic oxide ceramic substrate (such as cordierite or mullite) with a porous carrier (such as alumina, silica or zeolite) and supporting thereon an active metal, such as platinum alone or platinum and at least one metal selected from the group consisting of nickel, cobalt, palladium, rhodium, vanadium, tungsten, iridium, iron and rubidium.

Figure 2:
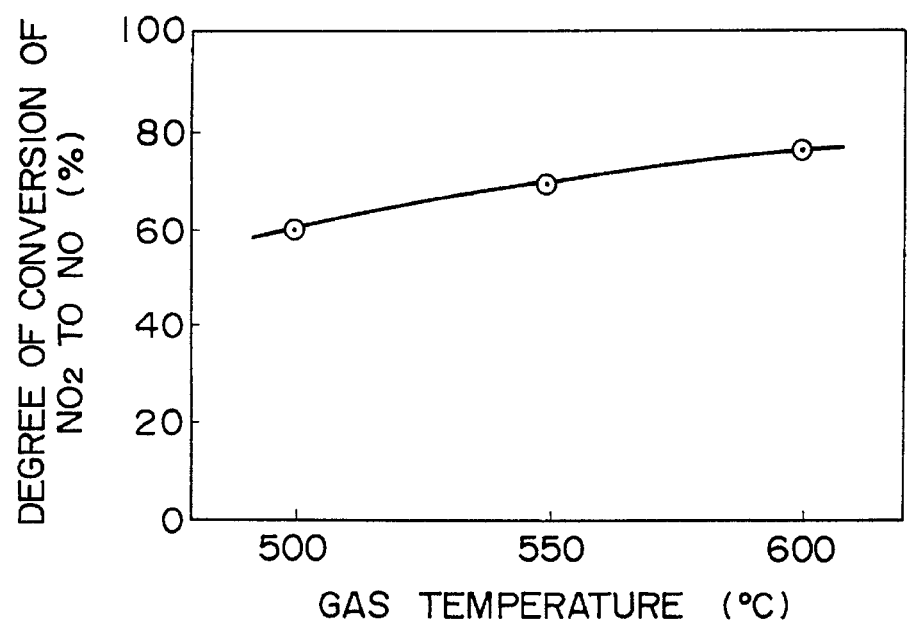
FIG. 2 is a graph showing the temperature dependence of the degree of conversion of $NO_2$ to NO achieved by using an $NO_2$ reduction catalyst for reducing $NO_2$ to NO.

The degree of conversion of $NO_2$ to NO achieved by using the above-described $NO_2$ reduction catalyst is shown in FIG. 2. As can be seen from FIG. 2, the degree of conversion is about 60% at 500° C., about 70% at 550° C., and about 76% at 600° C. Higher degrees of conversion are achieved at higher temperatures. Accordingly, the $NO_2$ reduction unit 11 should be installed immediately following the gas turbine 1.

EXPERIMENT 1

A catalyst composed of about 80% $TiO_2$, about 10% $WO_3$ and about 2% $V_2O_5$ with the balance being a forming aid was used in an atmosphere composed of 15% $O_2$, 6% $CO_2$, 6.7% $H_2O$, 100 ppm $NO_x$ and the balance $N_2$ and having a flow rate of 315N liters/hour and a temperature of 300° C. The proportion of $NO_2$ in $NO_x$ was varied to evaluate its influence on denitration performance. As a result, it was found that, as shown in FIG. 3, the denitration performance began to lower when the proportion of $NO_2$ in $NO_x$ exceeded 50% and the lowering tendency became more pronounced when it exceeded 70%.

EXPERIMENT 2

A catalyst was prepared by using a catalyst carrier comprising a Cordierite honeycomb substrate wash-coated with γ-alumina, and supporting platinum thereon in an amount of 2 g per liter of the catalyst carrier. Using this catalyst, the effect of converting $NO_2$ to NO was examined in an atmosphere composed of 50 ppm $NO_2$, 16% $O_2$, 2% $CO_2$, 5% $H_2O$ and the balance $N_2$ and having a flow rate of 600N liters/hour and a temperature of 500°–600° C. As a result, degrees of conversion of 50% or greater were achieved as shown in FIG. 2. Thus, it has been confirmed that conditions in which $NO_x$ is efficiently removed can be achieved by installing a dry denitrator using $NH_3$ as a reducing agent on the downstream side of the $NO_2$ reduction unit.

Figure 3:
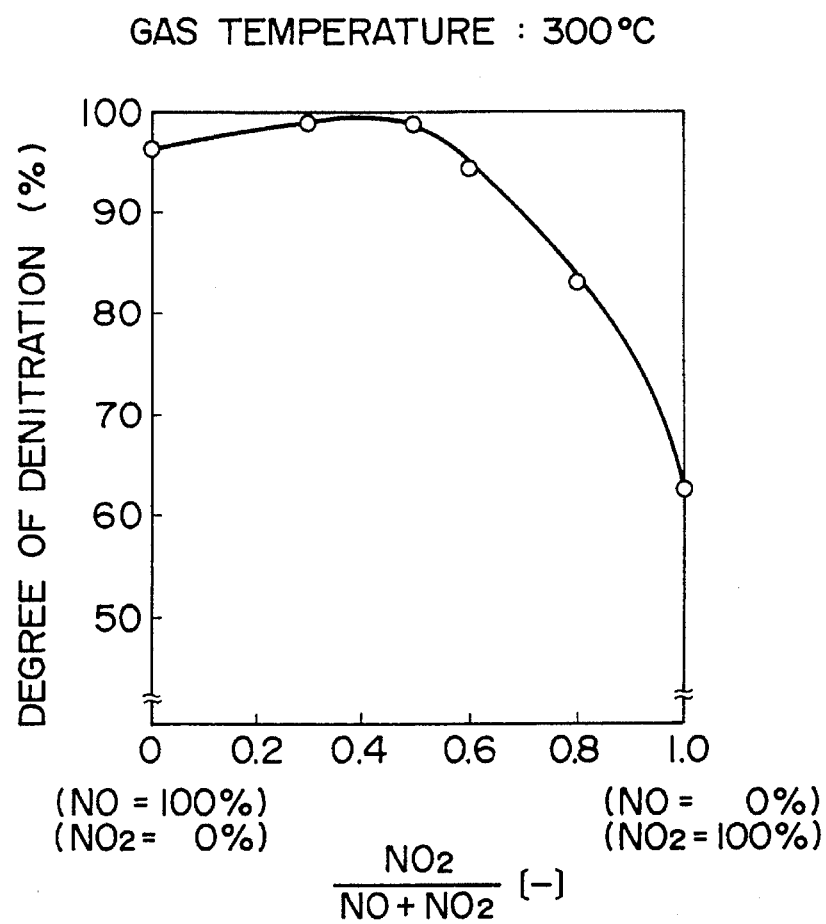
FIG. 3 is a graph showing the degree of denitration as a function of the proportion of $NO_2$ in $NO_x$.
Figure 4:
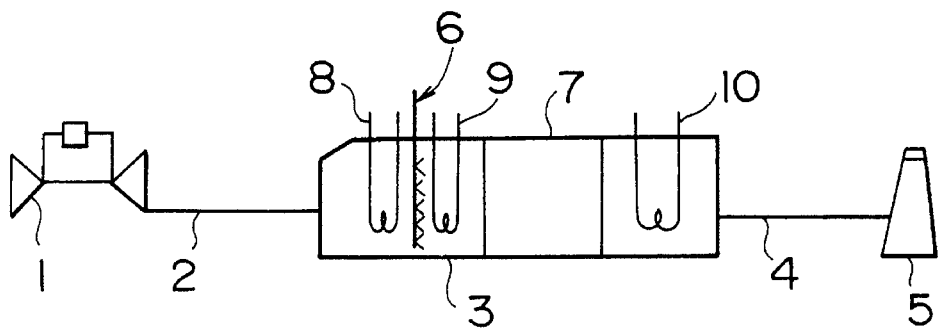
FIG. 4 is a schematic flow diagram illustrating a conventional denitration system for exhaust gas from a gas turbine.

In connection with Experiment 1, the relationship between the $NO_2/NO_x$ ratio and the denitration performance is shown in FIG. 3. Specifically, when the $NO_2/(NO+NO_2)$ ratio is in the range of 0 to 50%, the degree of denitration is 95% or greater. The degree of denitration is about 90% at a $NO_2/(NO+NO_2)$ ratio of 70%, and becomes lower at higher $NO_2/(NO+NO_2)$ ratios. Consequently, if the $NO_2$ reduction catalyst is used in such an amount as to give a $NO_2/(NO+NO_2)$ ratio of not greater than 70% and preferably not greater than 50%, the degree of denitration in the $NO_x$ denitration unit disposed downstream of the $NO_2$ reduction unit in the exhaust gas flow will always be maintained at 90% or greater, thus making it possible to remove $NO_x$ more efficiently.

We claim:

1. A method for the denitration of an $NO_x$-containing exhaust gas including $NO_2$ from a gas turbine or an internal combustion engine which comprises:

(a) reducing part of the $NO_2$ present in the exhaust gas to NO by means of a reduction catalyst bed for reducing $NO_2$ to NO, wherein the reduction catalyst bed comprises platinum supported by a carrier comprising at least one porous material selected from the group of alumina, silica, and zeolite, and wherein the reduction catalyst bed is installed in flow communication with an exhaust gas outlet of the gas turbine or internal combustion engine in such a way that the conversion to NO takes place in the catalyst bed at a gas temperature between 500° and 600° C., and (b) injecting $NH_3$ into the exhaust gas from step (a) within an exhaust heat recovery unit and then decomposing and removing residual $NO_x$ and formed NO contained in the exhaust gas by means of a denitration catalyst bed installed within the exhaust heat recovery unit to effect catalytic reduction of residual $NO_x$ and formed NO with $NH_3$.

2. The method of claim 1 wherein the reduction catalyst bed for reducing $NO_2$ to NO causes a proportion of $NO_2$ in the $NO_x$ contained in the exhaust gas to be lowered to 70% or less.

3. The method of claim 1 wherein the reduction catalyst bed for reducing $NO_2$ to NO causes a proportion of $NO_2$ in the $NO_x$ contained in the exhaust gas to be lowered to 50% or less.

4. The method of claim 1 wherein the reduction catalyst bed is directly connected with said exhaust gas outlet of the gas turbine or internal combustion engine.

5. The method of claim 1 wherein the carrier for the reduction catalyst bed for reducing $NO_2$ to NO is prepared by wash-coating an inorganic oxide ceramic substrate with said at least one porous material.

6. The method of claim 5 wherein the catalyst bed is composed of platinum and at least one metal selected from the group consisting of nickel, cobalt, palladium, rhodium, vanadium, tungsten, iridium, iron and rubidium.

\* \* \* \* \*